United States Patent [19]
Kinoshita

[11] Patent Number: 6,032,487
[45] Date of Patent: Mar. 7, 2000

[54] FABRICATION PROCESS OF A GRADIENT INDEX TYPE OF OPTICAL ELEMENT

[75] Inventor: Hiroaki Kinoshita, Hachioji, Japan

[73] Assignee: Plympus Optical Co., Ltd., Tokyo, Japan

[21] Appl. No.: 09/324,110

[22] Filed: Jun. 2, 1999

Related U.S. Application Data

[63] Continuation of application No. 08/755,036, Nov. 22, 1996, abandoned.

[30] Foreign Application Priority Data

Nov. 24, 1995 [JP] Japan ................................ 7-305455
Nov. 18, 1996 [JP] Japan ................................ 8-306628

[51] Int. Cl.[7] .......................... C03B 8/00; C03C 15/00; C03C 21/00; C03C 17/00
[52] U.S. Cl. .......................... 65/17.2; 65/30.1; 65/30.13; 65/31; 65/60.52
[58] Field of Search ..................... 65/17.2, 30.1, 65/30.13, 31, 60.52, 399, 111, 400, 440

[56] References Cited

U.S. PATENT DOCUMENTS

| | | | |
|---|---|---|---|
| 4,686,195 | 8/1987 | Yamane | 501/12 |
| 5,068,208 | 11/1991 | Haun et al. | 501/12 |
| 5,171,344 | 12/1992 | Noda | 65/3.11 |
| 5,182,236 | 1/1993 | Caldwell et al. | 521/12 |
| 5,238,880 | 8/1993 | Inami et al. | 501/12 |
| 5,308,802 | 5/1994 | Haun | 501/12 |
| 5,356,840 | 10/1994 | Noda | 501/12 |
| 5,439,495 | 8/1995 | Koike et al. | 65/17.2 |

FOREIGN PATENT DOCUMENTS

| | | |
|---|---|---|
| 4-55339 | 2/1992 | Japan . |
| 4-108626 | 4/1992 | Japan . |
| 5-306126 | 11/1993 | Japan . |

*Primary Examiner*—Stanley S. Silverman
*Assistant Examiner*—Jacqueline A. Ruller
*Attorney, Agent, or Firm*—Pillsbury Madison & Sutro LLP

[57] ABSTRACT

The invention provides a process of obtaining a gradient index type of optical element with profiles of first and second metal component concentrations by the sol-gel method. The process of fabricating a gradient index type of optical element comprises steps of dipping a silicon component-containing wet gel prepared by the sol-gel method in a solution containing an alkoxide of at least one metal component selected from a first group consisting of Ti, Nb, Ta, and Zr or a derivative thereof to thereby impart to the wet gel a concentration gradient with a concentration of the first metal component decreasing from a periphery to a center of the wet gel, allowing at least one metal component selected from a second group consisting of Ba, La, Y, Gd, Sr, Ca, and Zn to be dissolved out of the wet gel to thereby impart to the wet gel a concentration gradient with a concentration of the second metal component increasing from the periphery to the center of the wet gel, and drying, and firing the wet gel.

11 Claims, No Drawings

FABRICATION PROCESS OF A GRADIENT INDEX TYPE OF OPTICAL ELEMENT

This application is a continuation of application Ser. No. 08/755,036, filed Nov. 22, 1996 now abandoned.

BACKGROUND OF THE INVENTION

The present invention relates to a process of fabricating a gradient index type of optical element (hereinafter often referred to as a gradient index optical element) applicable to optical elements for cameras, microscopes, endoscopes, electronic imaging systems, etc.

A gradient index optical element includes a medium to which a gradient index is so imparted that the medium itself can have (refracting) power. Gradient index optical elements now draw attention as optical elements inevitable for optical systems of the next generation because their excellent ability to compensate for aberrations will make it possible to reduce the number of lenses which optical systems have.

Depending on diametrical changes in refractive index and Abbe number, the gradient index optical element is broken down into two types: one called a positive refracting power type of gradient index optical element having refracting power decreasing from a central direction to a peripheral portion of glass, and the other called a negative refracting power type of gradient index optical element of increasing refracting power, as viewed in the same direction. An element which has an Abbe number that decreases with an increase of refractive index is called a high-dispersion profile type, an element which has an Abbe number that increases rather than decreases called a negative dispersion profile type, and an element which has an Abbe number that remains virtually constant is called a low-dispersion profile type. Various combinations of refractive index changes and Abbe number changes lead to optical elements which include an element called a positive refracting power type of negative dispersion gradient index optical element, and an element called an ultra-dispersion gradient index optical element in which its refractive index does not much change but its Abbe number changes by a large amount.

"Microoptics News", Vol. 9-3 (1991), pp. 13–18, Japan Optics, '92 Preprint, JP-A-3-141302, "SPIE", Vol. 1780 (1992), pp. 456–463 and other publication disclose that the low-dispersion, and negative dispersion types are effective for gradient index optical elements which are usable with white light sources, and are excellent in the ability to make correction for chromatic aberration. "Applied Optics", Vol. 25, No. 18 (1986), pp. 3351–3355, too, reports that the negative refractive power type of gradient index optical element excels in its ability to correct for aberrations.

On the other hand, JP-A-6-148405 discloses an ultra-dispersion gradient index composition. To fabricate such a gradient index optical element with excellent ability to correct for chromatic aberration, the concentration of a metal component such as Ti, Nb, and Ta must have a so-called concave profile such that it increases continuously from a central direction to a peripheral portion of glass.

In general, the gradient index optical element is fabricated by sol-gel, ion exchange, molecular stuffing, and other techniques. In particular, the sol-gel method now attracts attention for reasons of some characteristic advantages. For example, this makes it possible to obtain glasses having a large aperture, and enables oxides of polyvalent metals to have a profile and the resulting gradient index optical element to vary in optical characteristics.

JP-A-4-108626 discloses a process of imparting a diametrically concave concentration profile of reaction solution to a dopant-containing wet gel by cooling the system to a temperature at which the wet gel does not react with the reaction solution. Problems with this process are, however, that the solubility of metal components varies largely with a temperature change of the solution, resulting in the precipitation of the metal components, difficulty is encountered in the selection of the solvent to be used, and the reproducibility of the refractive index profile obtained is less than satisfactory.

JP-A-5-306126 discloses a process of introducing a metal salt into a wet gel from outside to obtain a negative refracting power type of gradient index optical element. However, a gradient index optical element such as one, to which metal components contributing greatly to a refractive index, for instance, Ti, Nb, Ta, and Zr are imparted in the form of a diametrically convex profile, has difficulty in applications because no suitable salts of those metals are available.

JP-A-4-55339 discloses that first dopant-containing gels are immersed in a suitable eluting solution to impart a profile to the first dopant, and to give a profile to a second component as well. When attempts are made at obtaining gradient index glasses having low dispersion or a negative dispersion profile, on the other hand, it is required to introduce metal species to be convexly distributed in wet gels, for instance, Ba, La, Y, Gd, Sr, Ca, Ge, Zr, and Zn, in the wet gels in the form of metal alkoxides. However, some limitation is imposed on the amount of the alkoxides of these metal species introduced in the wet gels because most of them are solid or low in solubility. In other words, no glasses having a large concentration difference are obtainable because it is impossible to impart a large metal concentration difference to the wet gels.

JP-A-62-292624, and JP-B-5-82332 disclose processes of obtaining glasses containing metals such as $SiO_2$—$TiO_2$ by drying wet gels into dry gels, firing the dry gels into a porous body, and dipping the porous body in a solution containing Ti or the like to homogeneously impregnate the body with the metal component. However, when these processes are used to attempt imparting a diametrically concave profile to titanium by reducing the dipping time of the porous body in the titanium-containing solution, some problems arise. That is, since the dry gels have been thermally treated at high temperature, Si—O—Si bond arms are firmly bonded with one another or, in another parlance, the number of reactive Si—OH groups is reduced, resulting in too little a titanium component being bonded to Si—O—Si. Consequently, portions of the titanium component which take no part in Si—O—Ti bonds aggregate upon being fired, and so cause crystallization of anatase responsible for devitrification. In addition, the optical properties of lenses obtained by polishing the resulting glasses become undesirable due to titanium inhomogeneity in minute regions.

JP-B-7-33248 discloses a process of modifying the surface of a so-called silica aerogel exhibiting various unique physical properties, for instance, having transparency, thermal insulation, low density, and low refractive index by dipping silica gels obtained from sols hydrolyzed by the addition of ammonia thereto in an alcohol, using a dehydrating agent to dehydrate the alcohol including a liquid phase in the wet gels, diffusing an alcohol solution of a metal oxide capable of condensing with a surface hydroxyl group of silica into voids in a network structure of wet gels for condensation with the surface hydroxyl group of silica, removing unreacted metal compounds from the wet gels, and finally subjecting the wet gels to ultra-critical drying.

Even when the silica aerogel is thermally treated for surface modification purposes, however, it is heated at barely about 500° C. at which pores or voids remain intact. Accordingly, growth of titanium oxide nuclei are not so noticeable that the physical properties are little, if any, affected. In the present invention, however, it is required that gels be heated at such a high temperature at which pores vanish due to vitrification. In the process during which the gels are heated to the temperature at which they are deprived of pores, there has been observed a phenomenon that the crystallization of the whole system proceeds with the nucleation of titanium oxide, thus causing anatase to be crystallized out in the resulting glass and, hence, making the glass whitish and crystalline.

Processes for treating sols with salts of metals such as barium or lanthanum previously contained in them often cause the precipitation of the metal salts when the pH of the sols is shifted to an alkaline side, thus failing to obtain homogeneous sols. For these processes, therefore, it is required that the pH of the sols be shifted to an acidic side by the addition of acetic or other acid thereto.

JP-A-61-101425 discloses a process of obtaining gradient index glasses by dipping wet gels containing both silicon alkoxide and a refractive index-increasing metal alkoxide component in a solution containing a refractive index-lowering metal alkoxide for exchange reactions between metal species. With this process, however, it is impossible to fabricate gradient index lenses having a low or negative dispersion profile, or an ultra-dispersion profile, because of difficulty in preparing alkoxides of stable yet easy-to-handle metals such as Ba, and so the metal species selected for the low refractive index component is practically limited to phosphorus, boron, and the like.

A primary object of the present invention is to provide a process of fabricating a gradient index optical element by the sol-gel method, and a particular object of the present invention is to provide a process of fabricating a gradient index type of optical element—which has a refractive index profile controlled with high precision and excels in the ability to correct for chromatic aberration—at lesser steps, in higher yields, and in more rapid manners, when compared with conventional processes, in which process the concentration of a metal component which is unavailable in the form of a suitable salt capable of being introduced in a wet gel, for instance, Ti, Nb, Ta, and zr is provided in a diametrically concave profile, and the concentration of a metal component selected from Ba, La, Y, Gd, Sr, Ca, Ge, Zr, and Zn is provided in a diametrically convex profile.

SUMMARY OF THE INVENTION

One aspect of the present invention provides a process of fabricating a gradient index type of optical element, which comprises steps of:

dipping a wet gel prepared by gelation of a silicon component-containing sol in a solution containing an alkoxide of at least one metal component selected from a first group consisting of titanium or Ti, niobium or Nb, tantalum or Ta, and zirconium or Zr or a derivative thereof to thereby impart to the wet gel a concentration gradient with a concentration of the first metal component decreasing from a periphery to a center of the wet gel;

allowing at least one metal component selected from a second group consisting of barium or Ba, lanthanum or La, yttrium or Y, gadolinium or Gd, strontium or Sr, calcium or Ca, and zinc or Zn to be dissolved out of the wet gel to thereby impart to the wet gel a concentration gradient with a concentration of the second metal component increasing from the periphery to the center of the wet gel; and drying, and firing the wet gel.

Another aspect of the present invention provides a process of fabricating a gradient index type of optical element wherein after gelation of a sol obtained by hydrolysis of silicon alkoxide with an acid, followed by addition of a solution containing at least one metal salt selected from a second metal component consisting of barium or Ba, lanthanum or La, yttrium or Y, gadolinium or Gd, strontium or Sr, calcium or Ca, and zinc or Zn, the sol is dipped in a solution containing an alkoxide of at least one metal component selected from a first group consisting of titanium or Ti, niobium or Nb, tantalum or Ta, and zirconium or Zr or a derivative thereof to thereby impart to the wet gel a concentration gradient with a concentration of the first metal component increasing from a periphery to a center of the wet gel while a concentration of the second metal component decreasing from the periphery to the center of the wet gel; and the wet gel is dried, and fired.

In these processes, it is preferred that the concentration of the metal species in the solution containing an alkoxide of at least one metal component selected from a first group consisting of titanium or Ti, niobium or Nb, tantalum or Ta, and zirconium or Zr or a derivative thereof is up to 0.3 mol/l.

In these processes, it is also preferred that the wet gel which has been subjected to dehydration is dipped in the solution containing an alkoxide of at least one metal component selected from a first group consisting of titanium or Ti, niobium or Nb, tantalum or Ta, and zirconium or Zr or a derivative thereof while, at the same time, the wet gel is further dehydrated.

DESCRIPTION OF THE PREFERRED EMBODIMENT

In the process of fabricating a gradient index optical element according to the present invention wherein the metal components introduced in the wet gel have concentration profiles, a sol obtained by mixing together silicon alkoxide, alcohol, water, and an acid is pored and allowed to stand alone in a molding vessel for gelation. Then, the resulting gel is dipped in a hydrophilic organic solvent such as alcohol to prepare a wet gel in which free water is removed from the gel. Subsequently, the wet gel is dipped in a solution of an organic solvent, an acid or water containing an alkoxide of a metal such as niobium or its derivative to gradually diffuse the metal component from the periphery to the center of the wet gel.

In the present invention, the wet gel for imparting a concentration profile to the metal components for forming a refractive index profile is obtained by subjecting a gel obtained from silicon alkoxide, etc., to gelation according to the following scheme:

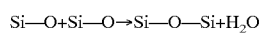

Upon dipped in the hydrophilic organic solvent, free water present in the gel is replaced by the organic solvent. The resulting wet gel contains some considerable amounts of unreacted Si—OH groups and terminal groups such as Si-Oδ⁻ more reactive than Si—O—Si bonds, unlike dry gels or porous bodies obtained by the firing of dry gels, but is substantially deprived of the free water. When dipped in a solution containing an alkoxide of a metal such as Ti, Nb, Ta, and Zr, therefore, the wet gel bonds via its Si—OH groups and more reactive terminal groups such as Si-Oδ⁻ to the metal component of the metal alkoxide contained in the solution to form Si—O—Me bonds where Me represents said metal component. Furthermore in this case, the metal component exists at a higher concentration in a peripheral portion of the wet gel than in a central portion of the wet gel; its concentration has a concave profile. When a wet gel containing much free water unaffected by gel skeletons is dipped in the solution containing an alkoxide of a metal such as Ti, Nb, Ta, and Zr, on the other hand, it yields an inhomogeneous metal oxide cluster due to the hydrolysis of the metal alkoxide by the free water, which in turn aggregates and behaves as a nucleating agent, leading to crystallization and devitrification of glasses upon being fired. For the introduction of the metal component containing an alkoxide of a metal such as Ti, Nb, Ta, and Zr according to the present invention, therefore, it is essentially required that the free water in the wet gel be replaced by the organic solvent.

In reference especially to a gel with titanium introduced in it, Ti—OH and Si—OH generate water upon dehydration and being condensed to form Si—O—Ti, and it is by this water that a titanium alkoxide solution is hydrolyzed. When this gel is thermally treated to a temperature at which it is deprived of pores, therefore, fine particles of titanium oxide behave as a nucleating agent, so that the gel is crystallized, causing the resulting glass to be devitrified. Devitrification offers no problem in the case of aerogels produced by heating dry gels at a temperature of about 500° C. However, when wet gels are heated to a temperature of about 700° C. at which they are deprived of pores, as contemplated in the present, invention, they are crystallized and, hence, devitrified. It is thus of vital importance for the present invention that water be removed from the wet gels even when they are being dipped in the titanium-containing solution.

The alkoxide to be introduced in the wet gel and its derivative include metal alkoxides with metal atoms bonded via oxygen atoms to alkyl groups, metal aryloxides with metal atoms bonded via oxygen atoms to aryl groups, compounds with metal atoms bonded via oxygen atoms of enol structure of $\beta$-diketone or $\beta$-keto-acid ester to each other, carboxylic acid derivatives, and metalloxane polymers. Exemplary compounds are titanium diisopropoxy(bis-2,4-pentanedionate) or $(iso-C_3H_7O)_2Ti(CH_3COCHCOCH_3)_2$, titanium bis(triethanolamine)diisopropoxide or $(iso-C_3H_7O)_2TiHOCH_2CH_2N(CH_2CH_2O)_2$, tantalum propoxide or $Ta(OC_3H_7)_5$, zirconium propoxide or $Zr(OC_3H_7)2$, and niobium ethoxide or $Nb(OC_2H_5)_5$.

When used in excess, or at a high concentration, with respect to the wet gel, the metal alkoxide containing a metal component such as Ti, Nb, Ta, and Zr or its derivative reacts with a trace of free water remaining in the wet gel, and aggregates and behaves as a nucleating agent, leading to crystallization and, hence, devitrification of glasses. Accordingly, the concentration and type of the solution containing said metal component should be appropriately varied while the desired concentration profile of the metal component and the state of the wet gel are taken into account. Preferably, the metal alkoxide concentration is up to 0.3 mol/l at or below which any inhomogeneous cluster is not formed. More preferably, the metal alkoxide concentration ranges from 0.01 to 0.1 mol/l because, at about 0.005 mol/l, white powders appearing to be ascribable to the metal alkoxide occur for some unknown reasons.

The concentration profiles of the first and second metal components throughout the wet gel may be provided either concurrently or separately, if required. By way of example, but not by way of limitation, this may be achieved in the following manners.

(1) First, a sol containing the second metal salt is prepared. Then, the sol is gelled to prepare a wet gel, which is in turn dipped in a solution in which the metal salt has a low solubility, thereby fixing the metal salt and precipitating crystallites in the wet gel. Thereafter, the wet gel is dipped in a solution containing the first metal alkoxide to form concentration profiles of the first and second metal elements concurrently, and those concentration profiles are fixed if required.

(2) A wet gel is prepared, and then dipped in a solution containing the first metal alkoxide to impart a concentration profile thereto, after which that profile is fixed, if required. Thereafter, the wet gel is dipped in a solution containing the second metal salt for uniform doping therewith, then in a solution in which the metal salt has a low solubility, thereby fixing the metal salt, then in a solution in which the metal salt has a high solubility, thereby imparting a concentration profile to the metal component, and finally in the solution in which the metal salt has a low solubility, thereby fixing the concentration profiles of the metal components.

(3) First, a sol containing the second metal salt is prepared. Then, the sol is gelled to prepare a wet gel, which is in turn dipped in a solution in which the metal salt has a low solubility, thereby fixing the metal salt and precipitating crystallites in the wet gel. Subsequently, the wet gel is dipped in a solution in which the second metal salt has a high solubility, thereby imparting a convex profile to the second metal component, and this concentration profile of the metal component is fixed. Thereafter, the wet gel is dipped in a solution containing the first metal alkoxide to form a concave profile of the first metal component, and the concentration profile is fixed, if required.

(4) A wet gel is prepared, and then dipped in a solution containing the second metal salt for uniform doping therewith, after which the wet gel is dipped in a solution in which the metal salt has a low solubility, thereby fixing the metal salt. Thereafter, the wet gel is dipped in a solution of the first metal alkoxide to form concentration profiles of the first and second metal salts concurrently, and those concentration profiles are fixed, if required.

The process of the present invention is so reduced in the number of steps involved that optical elements can be easily fabricated, because all steps of the process can be carried out in a wet-gel state. The present process is also effective for cases where it is required to independently control profiles of the metal components depending on a solubility difference, etc., between the metal alkoxide and the metal salt, for instance, for cases where particularly precise metal concentration profiles are needed, because the metal species forming a concave profile and the metal species forming a convex profile can be separately imparted to the wet gel.

The present invention will now be explained at great length with reference to the fabrication of glasses having an ultra-dispersion profile, in which a titanium component of an $SiO_2$—$TiO_2$—$BaO$—$K_2O$ system has a concave concentration profile and a barium component thereof has a convex concentration profile, or a positive refracting power type of gradient index glasses having a low and negative dispersion profile.

At the step of preparing the wet gel, a sol with a metal salt such as barium acetate previously added thereto is so gelled that the metal salt is fixed in the wet gel by making use of a solubility difference, etc. Following this, the wet gel is dipped in a titanium alkoxide-containing solution to introduce the titanium component therein to impart a concave profile thereto and, at the same time, the barium salt is dissolved out of the wet gel to impart a convex profile of barium thereto. The solvent used at this time must be capable of solubilizing both titanium alkoxide and the barium salt concurrently, and alcohols such as methanol are best suited to this end.

The concurrent formation of the concentration profiles of the first and second metal components has been described; however, it is to be understood that the order of imparting concentration profiles to the first and second metal components is not critical.

If metal species different from both silicon and titanium, for instance, zirconium is added to the wet gel, it is then possible to obtain a glass body comprising much more components, which is improved in terms of weather resistance, and acid resistance.

Furthermore, if metal components to which profiles are to be imparted are first contained in the wet gel during its preparation, it is then possible to increase the amount of said metal components to be contained.

Various means as mentioned above make it possible to obtain gradient index optical elements formed of glasses having varied optical properties.

The present invention will now be explained specifically with reference to some examples.

EXAMPLE 1

A mixture of 80 grams of $Si(OCH_3)_4$ with 110 grams of ethanol was agitated for 1 hour with the addition of 20 grams of 2N hydrochloric acid. On the other hand, a mixed solution of 20 grams of $Ti(O_nC_4H_9)_4$ with 90 grams of ethanol was prepared in a dry box, and then added to the aforesaid solution for a one-hour stirring. Another mixed solution of 40 grams of barium nitrate, 140 grams of water, and 70 grams of 17N acetic acid was added to the aforesaid solution, and the whole system was vigorously stirred for 10 minutes to obtain a homogeneous sol product. This sol product was poured in a fluorocarbon vessel in the form of a cylinder of 12 millimeters in inner diameter, gelled at room temperature, and finally aged at 50° C. for 6 days to obtain one hundred wet gel products. Subsequently, the obtained wet gel products were removed from the vessel, and then dipped twice in a mixed solution of 16 grams of lactic acid with 1,400 grams of ethanol, so that free water in the gel was replaced by the alcohol with uniform precipitation of crystallites of the barium salt in gel pores.

Fifty (50) of the aforesaid gel products were dipped in a mixed solution of 81 grams of $Ti(O_nC_4H_9)_4$, 1,900 grams of methanol, 71 grams of potassium acetate and 18 grams of lactic acid for 5 hours to concurrently impart a convex concentration profile and a concave concentration profile to the barium and titanium components in the gel, respectively.

These gel products were dipped in 1,900 grams of acetone for 24 hours to fix the barium, potassium, and titanium components.

By drying, and firing these gel products it was possible to impart a concave form of metal component concentration profile to the titanium component and a convex form of metal component concentration profile to the barium component and, hence, obtain a gradient index type of optical elements, each having the desired negative dispersion profile. Of the thus produced 50 samples, 34 were crack-free, transparent glasses. The remaining samples were found to be devitrified or cracked due to the anatase crystallization of titanium.

EXAMPLE 2

The remaining 50 wet gel products prepared in Example 1 were subjected to dipping treatments using solutions containing 30 to 60 grams of magnesium sulfate depending on the amount of the solutions used, while water contained in gel pores and water generated by polycondensation reactions were removed. As a result, 46 of the 50 samples were crack-free, transparent glasses. In other words, good-enough glasses could be obtained in higher yields than achieved in Example 1.

EXAMPLE 3

One hundred (100) grams of silicon ethoxide, 22 grams of aluminum isopropoxide, and 30 grams of lanthanum propoxide were hydrolyzed using ethanol, water, and hydrochloric acid to obtain a sol product. The sol product was poured in a fluorocarbon vessel of 12 millimeters in inner diameter, gelled, and aged to obtain a gel product. The gel product was dipped twice in an 800-ml mixed solution of isopropanol and acetone under a 24-hour agitation.

After this, the gel product was dipped in a methanol solution of sodium methoxide to impart a convex profile to the lanthanum component whereupon the convex profile was fixed with acetone. Then, the gel product was dipped in an isopropanol solution of niobium propoxide with a metal component content of 0.005 mol/l to impart a concave profile to the niobium component, followed by washing with acetone.

By drying, and firing this gel product it was possible to impart a concave form of metal component concentration profile to the niobium component and a convex form of metal component concentration profile to the lanthanum component and, hence, obtain a gradient index type of optical element having the desired negative dispersion profile.

EXAMPLE 4

One hundred (100) grams of silicon ethoxide, 22 grams of aluminum isopropoxide, and 30 grams of lanthanum propoxide were hydrolyzed using ethanol, water, and hydrochloric acid to obtain a sol product. The sol product was poured in a fluorocarbon vessel of 12 millimeters in inner diameter, gelled, and aged to obtain a gel product.

The gel product was dipped twice in an 800-ml mixed solution of isopropanol and acetone, to which 50 grams of a dehydrating molecular sieve 3A were added, under a 24-hour agitation. After this, the gel product was dipped in a methanol solution of sodium methoxide to impart a convex profile to the lanthanum component whereupon the convex profile was fixed with acetone. Then, the gel product was dipped in an isopropanol solution of niobium propoxide with a metal component content of 0.6 mol/l to impart a concave profile to the niobium component, followed by washing with acetone.

By drying, and firing this gel product it was possible to impart a concave form of metal component concentration profile to the niobium component and a convex form of metal component concentration profile to the lanthanum component and, hence, obtain a gradient index type of optical element having the desired negative dispersion profile.

EXAMPLE 5

One hundred (100) grams of silicon ethoxide, 22 grams of aluminum isopropoxide, and 30 grams of lanthanum propoxide were hydrolyzed using ethanol, water, and hydrochloric acid to obtain a sol product. The sol product was poured in a fluorocarbon vessel of 12 millimeters in inner diameter, gelled, and aged to obtain a gel product. All the following gel-dipping solutions contained 50 grams of a dehydrating molecular sieve 3A.

The gel product was dipped twice in an 800-ml mixed solution of isopropanol and acetone under a 24-hour agitation. After this, the gel product was dipped in a methanol solution of sodium methoxide to impart a convex profile to the lanthanum component whereupon the convex profile was fixed with acetone. Then, the gel product was dipped in an isopropanol solution of niobium propoxide with a metal component content of 0.6 mol/l to impart a concave profile to the niobium component, followed by washing with acetone.

By drying and firing this gel product, it was possible to impart a concave form of metal component concentration profile to the niobium component and a convex form of metal component concentration profile to the lanthanum component and, hence, obtain a gradient index type of optical element having the desired negative dispersion profile in an about 70% yield.

EXAMPLE 6

Tetramethoxysilane or $Si(OCH_3)_4$, tantalum propoxide or $Ta(OC_3H_7)_5$, barium acetate or $Ba(OCOCH_3)_2$, and potassium acetate or $KOCOCH_3$ were used for starting silicon, tantalum, barium, and potassium materials.

Then, 35 milliliters of ethanol and 4.8 milliliters of 2N hydrochloric acid were added to and stirred with 20.9 grams of $Si(OCH_3)_4$ for 1 hour, and the solution was stirred at room temperature for a further 10 minutes together with a solution of 8 grams of barium acetate dissolved in 15 milliliters of water with the addition of 8 milliliters of acetic acid. Forty (40) sol products were poured in a polypropylene vessel of 12 millimeters in inner diameter, allowed to stand alone in a thermostat of 40° C. for gelation, and aged. The obtained wet gel products were removed from the vessel. These gel products were dipped in a mixed solution of ethanol and lactic acid to fix crystallites of barium acetate within gel pores.

Then, the gel products were dipped in a mixed solution of 5 grams of $Ta(OC_3H_7)_5$, 70 milliliters of ethanol, and 16 milliliters of acetic acid under a 5-hour stirring to impart convex and concave profiles to Ta and Ba, respectively.

These gel products were dipped in acetone to fix Ta and Ba within gel pores. By drying, and firing these gel products it was possible to impart a concave form of metal component concentration profile to the tantalum component and a convex form of metal component concentration profile to the barium component and, hence, obtain a gradient index type of optical elements, each having the desired negative dispersion profile.

COMPARATIVE EXAMPLE 1

Gel-dipping treatments were carried out following Example 5 with the exception that the molecular sieve (1) was not used throughout the dipping treatments, and (2) was used for the profiling treatments alone.

As a result, transparent, crack-free glasses were obtained in low yields, viz., (1) in a 10% yield, and (2) in a 45% yield.

According to the inventive process of fabricating a gradient index type of optical element as explained above, it is possible to use the sol-gel method to fabricate a gradient index type of optical element excelling in the ability to correct for chromatic aberration with fewer steps and in more rapid manner as compared with conventional processes, with diametrical profiles of the first metal component selected from Ti, Nb, Ta, and Zr, and the second metal component selected from Ba, La, Y, Gd, Sr, Ca, and Zn.

What is claimed is:

1. A process of fabricating a gradient index optical element, comprising steps of:

dipping a wet gel prepared by gelation of a silicon component-containing sol in a solution containing at least one metal salt selected from a second metal component group consisting of barium, lanthanum, yttrium, gadolinium, strontium, calcium, and zinc to thereby obtain a wet gel in which said wet gel contains said metal salt;

dehydrating the wet gel, and then dipping the wet gel in a solution containing an alkoxide of at least one metal component selected from a first metal component group consisting of titanium, niobium, tantalum, and zirconium or a derivative thereof to thereby impart to the wet gel a concentration gradient with a concentration of a first metal component decreasing from a periphery to a center of the wet gel while, at the same time, the wet gel is dehydrated;

allowing at least one metal salt selected from said second metal component group consisting of barium, lanthanum, yttrium, gadolinium, strontium, calcium, and zinc to be dissolved out of the wet gel to thereby impart to the wet gel a concentration gradient with a concentration of a second metal component, said at least one metal component selected from said second metal component group increasing from the periphery to the center of the wet gel; and drying and firing the wet gel.

2. A process of fabricating a gradient index optical element according to claim 1, wherein said solution containing said metal alkoxide or a derivative thereof contains the metal species at a concentration of up to 0.3 mol/l.

3. A process of fabricating a gradient index optical element, comprising:

obtaining a sol by hydrolysis of a silicon alkoxide with an acid and adding to a hydrolysis product a solution containing at least one metal salt selected from a second metal component group consisting of barium, lanthanum, yttrium, gadolinium, strontium, calcium, and zinc, and gelating said sol;

dehydrating the wet gel, and dipping the wet gel in a solution containing an alkoxide of at least one metal component selected from a first metal group consisting of titanium, niobium, tantalum, and zirconium or a derivative thereof to thereby impart to the wet gel a concentration gradient with a concentration of a first metal component decreasing from a periphery to a center of the wet gel while, at the same time, the wet gel is dehydrated; and drying and firing the wet gel.

4. A process of fabricating a gradient index optical element according to claim 3, wherein said solution containing said metal alkoxide or a derivative thereof contains the metal species at a concentration of up to 0.3 mol/l.

5. A process of fabricating a gradient index optical element according to claim 3, further comprising a step of:

allowing at least one metal salt selected from said second metal component group consisting of barium, lanthanum, yttrium, gadolinium, strontium, calcium, and zinc to be dissolved out of the wet gel to thereby impart to the wet gel a concentration gradient with a concentration of a second metal component, said at least one metal component selected from said second metal component group increasing from the periphery to the center of the wet gel.

6. A process of fabricating a gradient index optical element, comprising the step of:

dipping a wet gel prepared by gelation of a silicon component-containing sol in a solution containing at least one metal salt selected from a second metal component group consisting of barium, lanthanum, yttrium, gadolinium, strontium, calcium, and zinc to thereby obtain a wet gel in which said wet gel contains said metal salt;

dipping the wet gel in a solution containing a metal alkoxide of at least one metal component selected from a first metal component group consisting of titanium, niobium, tantalum, and zirconium or a derivative thereof to thereby impart to the wet gel a concentration gradient with a concentration of a first metal component decreasing from a periphery to a center of the wet gel;

eluting from the wet gel at least one metal salt selected from the second metal component group consisting of barium, lanthanum, yttrium, gadolinium, strontium, calcium, and zinc thereby to impart to the wet gel a concentration gradient with a concentration of the second metal component increasing the periphery to the center of the wet gel; and said process further comprising a step of dehydrating the wet gel before the wet gel is dipped in the solution containing a metal alkoxide of at least one metal component selected from the first metal component group consisting of titanium, niobium, tantalum and zirconium or a derivative thereof;

drying and firing the wet gel.

7. A process according to claim 6, wherein the dehydrating step includes dipping the wet gel in a hydrophilic organic solvent which contains a dehydrator.

8. A process of fabricating a gradient index optical element according to claim 6, wherein said solution of the dipping the wet gel in said solution containing an alkoxide of at least one metal component selected from said first metal component group consisting of titanium, niobium, tantalum, and zirconium or a derivative thereof contains a dehydrator.

9. A process of fabricating a gradient index optical element, comprising:

obtaining a sol by hydrolysis of a silicon alkoxide with an acid and adding to a hydrolysis product a solution containing at least one metal salt selected from a second metal component group consisting of barium, lanthanum, yttrium, gadolinium, strontium, calcium, and zinc, and gelating said sol;

dehydrating the wet gel by dipping the wet gel in a hydrophilic organic solvent containing a hydrator before dipping the wet gel in a solution containing an alkoxide of at least one metal component selected from a first metal component group consisting of titanium, niobium, tantalum, and zirconium or a derivative thereof;

dipping the wet gel in a solution containing an alkoxide of at least one metal component selected from a first metal component group consisting of titanium, niobium, tantalum, and zirconium or a derivative thereof to thereby impart to the wet gel a concentration gradient with a concentration of a first metal component increasing and a concentration of a second metal component decreasing, from a periphery to a center of the wet gel; and drying and firing the wet gel.

10. A process of fabricating a gradient index optical element according to claim 9, wherein the wet gel is dipped into a solution containing a dehydrator comprising an alkoxide of at least one metal component selected from said first metal component group consisting of titanium, niobium, tantalum, and zirconium or a derivative thereof.

11. A process of fabricating a gradient index, optical element according to claim 9, further comprising the step of:

allowing at least one metal salt selected from said second metal component group consisting of barium, lanthanum, yttrium, gadolinium, strontium, calcium, and zinc to be dissolved out of the wet gel to thereby impart to the wet gel a concentration gradient with a concentration of a second metal component, said at least one metal component selected from said second metal component group increasing from the periphery to the center of the wet gel.

* * * * *

UNITED STATES PATENT AND TRADEMARK OFFICE
CERTIFICATE OF CORRECTION

PATENT NO. : 6,032,487
DATED : March 7, 2000
INVENTOR(S) : Kinoshita

It is certified that error appears in the above-identified patent and that said Letters Patent is hereby corrected as shown below:

On the title page: Item

[73] Assignee: Please change

"Plympus Optical Co., Ltd., Tokyo, Japan"
to
--Olympus Optical Co., Ltd., Tokyo, Japan--

Signed and Sealed this

Fourth Day of July, 2000

Q. TODD DICKINSON

Attest:

Attesting Officer

Director of Patents and Trademarks